UNITED STATES PATENT OFFICE.

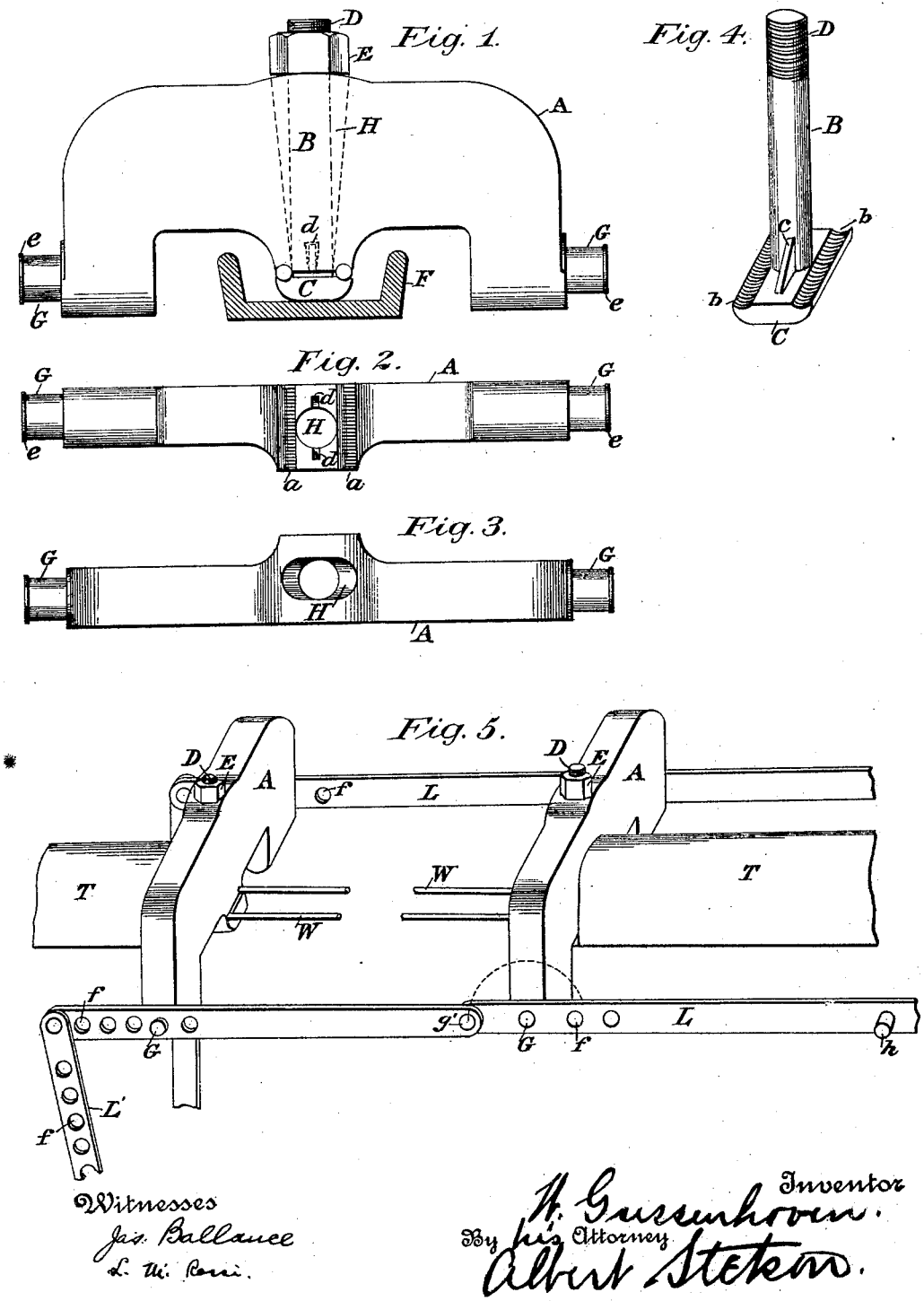

WALTER GUSSENHOVEN, OF NEW YORK, N. Y.

TIRE-CLAMPING DEVICE.

SPECIFICATION forming part of Letters Patent No. 692,275, dated February 4, 1902.

Application filed March 6, 1900. Serial No. 7,475. (No model.)

*To all whom it may concern:*

Be it known that I, WALTER GUSSENHOVEN, a citizen of the United States, and a resident of New York, in the county of New York and State of New York, have invented certain new and useful Improvements in Tire-Clamping Devices, of which the following is a specification.

My invention relates to machines for securing elastic tires upon vehicle-wheels.

The object of my invention is to furnish a device for engaging and holding under tension one or more wires such as are used in fastening elastic tires to vehicles while such wires are being brazed, electrowelded, or otherwise joined and the tire securely fixed in its channel.

A further object of my invention is to so arrange the various parts that wires of different diameters may be handled and the whole operation performed by one man by the simple motion of a lever, whereby a saving of time is effected and the unequal stretching or compression of the tire avoided.

To attain the object of my invention, I provide a pair of clamps adapted to rest in the channel-rim of the wheel, said clamps being provided with a detachable portion for gripping the wires, and the position of the clamps relative to each other being controlled by a pair of adjustable levers.

In the drawings, Figure 1 shows a front view of one of the clamps, its central bottom portion resting in a section of the wheel-rim.
Fig. 2 is a bottom view of Fig. 1, the drawbolt being removed; Fig. 3, a top view of the clamp, showing the oblong draw-hole tapering downwardly toward the bottom. Fig. 4 is the draw-bolt for gripping and holding the wires; and Fig. 5, a view of the two clamps in operative relation, showing the lever controlling the tension between the clamps.

Referring to the drawings, A is the body of the clamp, cut out below to allow of its setting down into and over the tire-rim F, having through its center vertically a tapering oblong bolt-hole H for receiving the drawbolt B. At the bottom of the clamp and adjacent to the bolt-hole are one or more corrugated grooves *a* for receiving the wires. Passing into the oblong tapered hole H is the drawbolt B, provided with a rectangular base-piece, which also has corrugated grooves *b*, adapted when in place to coöperate with the grooves *a* on the bottom of the clamp A. To prevent the draw-bolt from turning on its axis, it is provided with a pair of upwardly-extending wings *c*, which fit into the slots *d* in the body of the clamp. This draw-bolt is provided at the top with a screw-thread D, upon which is fastened the nut E. For engaging the operating-levers L the clamps are provided with lugs G, having a retaining-rim *e* to prevent the lever from slipping off the clamps when under strain. The bolt-hole of the clamp is made oblong in order to provide for clamping with a sure grip wires of unequal size. The adjustable levers L are provided at any desired intervals with the perforations *f*, adapted to receive the lugs G, projecting from the sides of the clamps. I have shown my clamps as suitable for handling tires that have two wires; but it is evident that it can be used for tires having any number of fastening-wires.

The clamp-body A, cut away at the bottom side, as shown in Fig. 1, is adapted to fit down into any channel in practical use and hold the wires in the same plane that they occupy in the rubber. Moreover, the lugs G are thus brought parallel with the wires in the tire and pull upon the lugs directly in line with the wires. The base of the drawbolt is also shaped so as to fit into the channel of any practical wheel and clasp the wires in the same horizontal plane occupied by them in the rubber, and its shape and arrangement allow the wires when brazed to be easily detached from the clamp and draw-bolt.

The top of the clamp is arched, so that the draw-bolt B is held tightly by the nut E when the bolt is tilted over on one side when holding wires of unequal size.

By jointing my adjustable lever, as shown in Fig. 5, so that the joint *g'* describes a partial or complete circumference, I obtain the advantage that when the levers are operated to bring the two clamps nearer together the one at the left is slightly raised in the channel, thereby diminishing the friction of the rubber in the channel and avoiding an undue stretching of the rubber.

The operation of my device is as follows: When the elastic portion of the tire T has been cut to the desired length and the wires inserted, the elastic portion is pushed back on the wires until it is under such compression that it will close up the joint after the retaining-wires have been joined. The draw-bolt is unscrewed sufficiently to allow the wires to be inserted into the corrugated grooves *a* and *b*, and the nut is screwed up, firmly holding the wires between the clamp and the draw-bolt. The clamps holding the opposite ends of the wires W are then placed in the rim F in the position shown in Fig. 5 and the adjustable levers L attached to the lugs G on the clamps. The two ends of the levers L at the right are simultaneously depressed around G as a fulcrum. The two portions of the lever swing on the joint $g'$. This joint describes a part of a circumference (shown in dotted lines in Fig. 5) around the lug G, and the lever is carried around and fastened by the projection *h* into one of the perforations *f* in the arm L'. The wires are then joined under a tension that can be regulated by means of the adjustable lever L. When the wires are joined, the draw-bolt B is loosened, the clamps lifted off, the wires pushed out of the grooves *b*, the draw-bolt removed from the channel-rim, and the ends of the elastic tire cemented together.

It will be noted that the lower end of the draw-bolt D is of substantially the same size as the lower end of the tapering bolt-hole H. The same, therefore, is adapted to bear against the inner surface of said bolt-hole at its lower end, whereas the upper end of said bolt is capable of lateral movement in the enlarged upper end of said bolt-hole. This provides for the use of the device upon wires of different diameters, and when in use and the bolt is swung from one side to the other the head or projection C thereof has its fulcrum upon one or the other of the wires to be stretched. While the bolt B is capable of lateral movement in its upper end, however, the lower end thereof is incapable of lateral movement or of movement in the direction of the length of the wires to be stretched. This is important, as it is necessary that when the bolt B is drawn into gripping relation to the wires no movement of the same at its gripping end be permitted.

An advantage of my adjustable lever, joined, as shown in Fig. 5, so that the joint $g'$ describes a partial or complete circumference, is that the pull instead of being directly along the channel, thereby unduly stretching the rubber, has an upward pull, as well as a longitudinal one.

Having thus fully described and illustrated my invention, what I claim is—

1. A clamp for the purpose described, comprising a body having wire-engaging portions thereon, an opening therethrough and a convex surface adjacent to one end of said opening, a draw-bolt whose stem projects through said opening and is of smaller diameter than the same and whose head is provided with wire-engaging portions coöperating with the corresponding parts on said body, and a nut upon the projecting end of said bolt adapted to engage said convex surface, as and for the purpose set forth.

2. A clamp for the purpose described comprising a body having wire-engaging portions thereon and having a transversely-elongated, longitudinally-tapering opening therein, a draw-bolt whose stem extends through and substantially fits the lower end of, and plays in the enlarged upper end of, said opening and whose head is provided with wire-engaging portions coöperating with those on said body, and means for moving said draw-bolt longitudinally in said opening, as and for the purpose set forth.

3. A clamp for the purpose described, comprising a body having wire-engaging portions thereon, a transversely-elongated, longitudinally-tapering opening therein and a convex surface adjacent to the upper end of said opening, a draw-bolt whose stem extends through said opening and whose head is provided with wire-engaging portions coöperating with those on said body, and a nut upon the projecting end of the stem of said bolt adapted to engage said convex surface, as and for the purpose set forth.

4. A clamp for the purpose described, comprising a body having wire-engaging portions thereon and having an opening extending therethrough, the said opening having a longitudinally-extending slot intersecting the same, a draw-bolt whose stem extends through said opening, is of smaller diameter than the same and is provided with a laterally-projecting rib adapted to fit within said slot and whose head is provided with wire engaging portions coöperating with those on said body, and means for moving said bolt longitudinally in said opening, as and for the purpose set forth.

5. A clamp for the purpose described, comprising a body having wire-engaging portions thereon and having a transversely-elongated, longitudinally-tapering opening therein, the said opening having longitudinally-extending, tapering slots intersecting the same, a draw-bolt whose stem extends through said opening and is provided with laterally-projecting wings which fit within said slots and whose head is provided with wire-engaging portions coöperating with those on said body, and means for moving said bolt longitudinally in said opening, as and for the purpose set forth.

6. A clamp for the purpose described, comprising a body having wire-engaging portions thereon, a transversely-elongated, longitudinally-tapering opening therein and a convex surface adjacent to one end of said opening, the said opening having longitudinally-extending, tapering slots intersecting the same, a draw-bolt whose stem extends through said opening and is provided with laterally-projecting wings which fit within said slots and whose head is provided with wire-engaging portions coöperating with those on said body, and a nut upon the projecting end of the stem of said bolt adapted to bear against said convex surface, as and for the purpose set forth.

7. In a device for securing elastic tires to vehicle-wheels, two clamps, each provided with wire-gripping means, and a pair of levers pivoted to each other and connected, respectively, to said clamps, as and for the purpose set forth.

8. In a device for securing elastic tires to vehicle-wheels, two clamps, each provided with wire-gripping means, a pair of levers pivoted to each other and connected, respectively, to said clamps, and means for locking said levers in any position to which they may be turned, as and for the purpose set forth.

9. In a device for securing elastic tires to vehicle-wheels, two clamps, each provided with wire-gripping means, a pair of levers pivoted to each other and connected respectively to said clamps, and means for connecting the free ends of said levers to each other, as and for the purpose set forth.

10. In a device for securing elastic tires to vehicle-wheels, two clamps, each provided with wire-gripping means, a pair of levers pivoted to each other and adjustably connected with the respective clamps, and means for locking the free ends of said levers to each other, as and for the purpose set forth.

11. In a device for securing elastic tires to vehicle-wheels, two clamps, each provided with wire-gripping means, a pair of levers pivoted to each other and adjustably connected with the respective clamps, a pivoted arm on one of said levers, and means for adjustably connecting said arm to the other of said levers, as and for the purpose set forth.

12. A device for securing elastic tires on vehicle-wheels, comprising a clamp bar or body adapted to fit into the channel of the wheel and having on its under surface a clamping projection adapted to project into the wheel-channel and having corrugated grooves for receiving the fastening-wires, said clamp having an arch-shaped top and provided with an oblong bolt-hole tapering downwardly, a draw-bolt having at its lower end a projection with corrugated grooves adapted to rest in the channel and hold the retaining-wires at the same level as they are in the rubber, said grooves coöperating with corresponding grooves on the clamp, and means for controlling the grip of the grooves upon the retaining-wires, substantially as described.

13. A clamp for securing elastic tires to vehicle-wheels comprising a bar or body recessed to fit over and project into the wheel-channel, having on its under surface corrugated grooves adapted to receive the fastening-wires and provided with a downwardly-tapering bolt-hole, a draw-bolt which substantially fits the lower end of said bolt-hole, plays in the enlarged upper end thereof and has in its lower end a projection provided with corrugated grooves adapted to coöperate with the grooves in said body, and means for moving said draw bolt longitudinally.

14. In a clamping device for securing elastic tires on vehicle-wheels, the combination of a screw-threaded bolt, a downwardly-tapering bolt-hole, the clamp-body having a rectangular end piece attached to said bolt and provided with corrugated grooves for receiving the fastening-wires, and wings projecting from the sides of said screw-bolt into a downwardly-tapering slot in said clamping device, all arranged to allow the clamp to hold at the same time wires of uneven size and adapted to prevent its turning on the screw-bolt axis, substantially as described.

15. In a clamp having an arch-shaped top for securing elastic tires to vehicle-wheels, the combination of an oblong bolt-hole tapering downward, vertical slots cut in said bolt-hole, a draw-bolt having side projections adapted to engage the vertical slots in the bolt-hole, said clamp and draw-bolt fitting into the channel and being provided with corresponding corrugated grooves for receiving and holding the retaining-wires, substantially as set forth.

16. In a device for securing elastic tires to vehicle-wheels, the combination of a pair of clamps, and a pair of levers pivoted to each other and having means for adjustably and detachably engaging said clamps, substantially as set forth.

17. In a device for securing elastic tires to vehicle-wheels, the combination of a pair of clamps adapted to rest in the channel of the wheel and provided with means for receiving and holding the retaining-wires, lugs attached to the sides of said clamps, a pair of levers pivoted to each other and having means for adjustably and detachably engaging the lugs on the clamps, and means for securing said lever when under strain, substantially as set forth.

18. In a device for securing elastic tires to vehicle-wheels, the combination of a pair of clamps adapted to rest in the wheel-channel and provided with means for receiving and holding the retaining-wires, lugs attached to the sides of said clamps, a pair of levers pivoted to each other and constructed to engage said lugs and adapted to relieve the friction of the tire in the channel when the ends of the wires are drawn together, substantially as described.

19. In a device for securing elastic tires to vehicles, the combination of a pair of clamps fitting in the wheel-channel, outwardly-projecting lugs adapted to detachably engage a pair of levers, and a pivoted joint in said levers for relieving the friction of the tire in the channel, substantially as set forth.

20. In a clamp for securing elastic tires to vehicle-wheels, the combination of a base provided with corrugated grooves and recessed to fit over and down into the wheel-channel, an arch-shaped top, a downwardly-tapering bolt-hole, a draw-bolt also provided with corrugated grooves, and means for controlling the grip of the grooves for accommodating wires of unequal diameter, substantially as set forth.

Signed at New York, in the county of New York and State of New York, this 2d day of March, A. D. 1900.

WALTER GUSSENHOVEN.

Witnesses:
ADOLPH BLOCH,
A. STETSON.